(12) United States Patent
Sandt

(10) Patent No.: US 10,423,007 B2
(45) Date of Patent: Sep. 24, 2019

(54) COUNTERWEIGHT DEVICE FOR EYEGLASSES

(71) Applicant: Sherry Sandt, Flowery Branch, GA (US)

(72) Inventor: Sherry Sandt, Flowery Branch, GA (US)

(*) Notice: Subject to any disclaimer, the term of this patent is extended or adjusted under 35 U.S.C. 154(b) by 0 days.

(21) Appl. No.: 15/467,491

(22) Filed: Mar. 23, 2017

(65) Prior Publication Data

US 2017/0285367 A1 Oct. 5, 2017

Related U.S. Application Data

(60) Provisional application No. 62/317,613, filed on Apr. 3, 2016.

(51) Int. Cl.
*G02C 11/02* (2006.01)
*G02C 3/00* (2006.01)

(52) U.S. Cl.
CPC .............. *G02C 3/003* (2013.01); *G02C 11/02* (2013.01)

(58) Field of Classification Search
CPC .... G02C 3/003; G02C 11/02; G02C 2200/16; G02C 2200/10; G02C 2200/20
USPC ........ 351/123, 158; D16/309, 323, 336, 341
See application file for complete search history.

(56) References Cited

U.S. PATENT DOCUMENTS

| | | | |
|---|---|---|---|
| 3,515,467 A | 6/1970 | Stewart | |
| 3,684,356 A * | 8/1972 | Bates | G02C 3/003 351/122 |
| 4,139,281 A * | 2/1979 | Luttner | G02C 11/00 351/111 |
| 4,917,479 A * | 4/1990 | Bidgood | G02C 5/143 351/118 |
| 4,974,955 A * | 12/1990 | Treadaway, Sr. | G02C 3/003 351/123 |
| 5,024,515 A * | 6/1991 | Beckemeyer | G02C 11/02 351/158 |
| 5,092,668 A * | 3/1992 | Welch | G02C 3/006 351/123 |
| 5,120,119 A | 6/1992 | Mats | |
| 5,281,983 A | 1/1994 | Lackides | |
| 6,142,623 A | 11/2000 | Jones | |
| 6,182,334 B1 * | 2/2001 | Davancens | G02C 3/003 24/3.1 |

(Continued)

*Primary Examiner* — Darryl J Collins
(74) *Attorney, Agent, or Firm* — Asgaard Patent Services, LLC; F. Wayne Thompson, Jr.

(57) ABSTRACT

Implementations of a counterweight device for eyeglasses are provided. In some implementations, a counterweight device may be secured to the backend of each temple and thereby remove some to all weight of the eyeglasses from the nose and/or cheeks of the wearer. In some implementations, a pair of counterweight devices may be used to counterbalance the weight of a pair of eyeglasses. In some implementations, a counterweight device may comprise an elastic loop attached to a weight by a connector. In some implementations, a counterweight device may include fasteners configured to removably secure a weight to an elastic loop or to another weight dangling from an elastic loop. In this way, through the use of threaded fasteners, the overall weight and/or look of a counterweight device may be changed by the wearer. In some implementations, a lanyard may be used in conjunction with a pair of counterweight devices.

14 Claims, 8 Drawing Sheets

(56) References Cited

U.S. PATENT DOCUMENTS

| | | | |
|---|---|---|---|
| 6,520,635 B1 * | 2/2003 | Ignatowski | A44C 15/003 351/157 |
| 8,593,795 B1 | 11/2013 | Chi | |
| 2004/0169815 A1 * | 9/2004 | Lambert | G02C 1/02 351/140 |
| 2009/0040455 A1 * | 2/2009 | Tahara | G02C 11/02 351/51 |
| 2009/0059161 A1 * | 3/2009 | Fernandes | G02C 11/00 351/158 |

* cited by examiner

COUNTERWEIGHT DEVICE FOR EYEGLASSES

CROSS REFERENCE TO RELATED APPLICATION

This application claims the benefit of U.S. patent application Ser. No. 62/317,613, which was filed on Apr. 3, 2016, and is incorporated herein by reference in its entirety.

TECHNICAL FIELD

This disclosure relates to implementations of a counterweight device for eyeglasses. More particularly, the present invention relates to a counterweight device that may be secured to the backend of each temple and thereby remove some to all weight of the eyeglasses from the nose and/or cheeks of the wearer.

BACKGROUND

Typical eyeglasses comprise two lenses, a nose bridge, and two temples. Some eyeglasses also include a frame that surrounds all or a portion of the lenses. The nose bridge typically positions at least a portion of the eyeglasses weight on the nose and/or cheeks of the wearer. The weight of the eyeglasses may cause the wearer headaches, dent their nose, and/or cause general discomfort. Further, the weight of the lenses may cause the eyeglasses to slide down the nose and become misaligned with the eyes, thereby impacting the vision of the wearer.

Accordingly, it can be seen that needs exist for a counterweight device for eyeglasses. It is to the provision of a counterweight device that is configured to remove some to all weight of the eyeglasses from the nose and/or cheeks of the wearer and/or to counterbalance the weight of the lenses, that the present invention is primarily directed.

SUMMARY OF THE INVENTION

Implementations of a counterweight device for eyeglasses are provided. In some implementations, a counterweight device may be secured to the backend of each temple and thereby remove some to all weight of the eyeglasses from the nose and/or cheeks of the wearer. In this way, the eyeglasses may be prevented from inducing headaches, denting the wearer's nose, and/or causing general discomfort. In some implementations, a pair of counterweight devices may be used to counterbalance the weight of a pair of eyeglasses. In this way, the eyeglasses may be prevented from sliding down the nose of the wearer and stay properly aligned with the eyes. In some implementations, each counterweight device may be decorative thereby enhancing the visual appeal of the eyeglasses to which they are attached.

In some implementations, a counterweight device may comprise an elastic loop (or cylindrical tube) attached to a weight by a connector (e.g., a jump ring and/or a braided thread). In some implementations, the weight may include decorative elements thereon. In some implementations, the elastic loop and the weight may be connected together using any suitable connector known to those of ordinary skill in the art.

In some implementations, the elastic loop may be stretched so that the opening thereof can fit about the backend of a temple of a pair of eyeglasses. In some implementations, the elastic loop may be fabricated from rubber (e.g., latex and/or non-latex) or any other material that is sufficiently elastic and/or resilient for use as part of a counterweight device.

In some implementations, the weight may be made of tungsten, a tungsten alloy, or another suitably dense material that is non-toxic. In some implementations, the weight may be bullet shaped. In some implementations, the weight may be any suitable shape.

In some implementations, when a pair of counterweight devices is used in conjunction with a pair of eyeglasses, the weight of each counterweight device may weigh the same, or approximately the same. In this way, the counterweight devices may be used to counterbalance the weight of the eyeglasses and thereby assist with aligning the lenses with the eyes of the wearer.

In some implementations, a counterweight device may include fasteners configured to removably secure a weight to an elastic loop and/or another weight dangling from an elastic loop. In this way, through the use of threaded fasteners, the overall weight and/or look of a counterweight device may be changed by the wearer.

In some implementations, a counterweight device may include a lanyard that is removably connected at each end thereof to a counterweight device. In this way, a pair of eyeglasses equipped with two counterweight devices may be hung from the neck of a wearer and/or prevented from falling off of the head.

In some implementations, the lanyard may be fixedly secured to the weight dangling from the elastic loop of a counterweight device.

In some implementations, the counterweight device may comprise an elastic tube and a weight that are positioned in-line within a cloth housing.

In some implementations, the counterweight device may include an elastic cap in-lieu of an elastic loop.

In some implementations, the counterweight device may include a bendable connector. In some implementations, the bendable connector may be configured to coil about a temple of a pair of eyeglasses and thereby secure a counterweight device thereon.

DETAILED DESCRIPTION

Figure 1A:
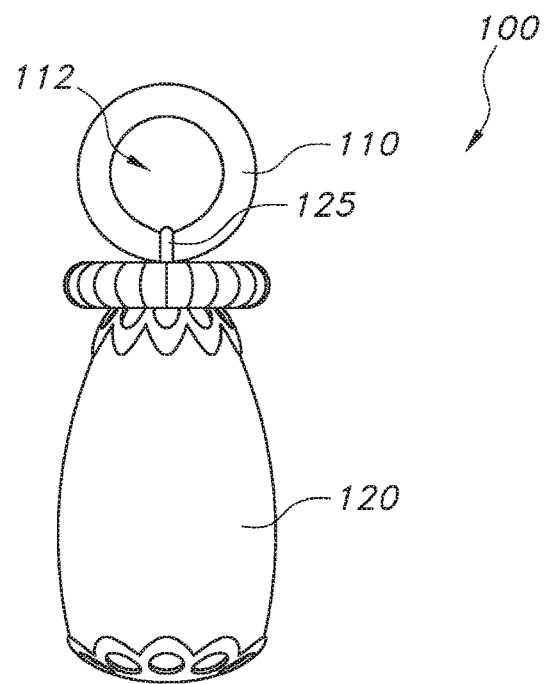
FIG. 1A illustrates a counterweight device 100 for eyeglasses according to the principles of the present disclosure.
Figure 1B:
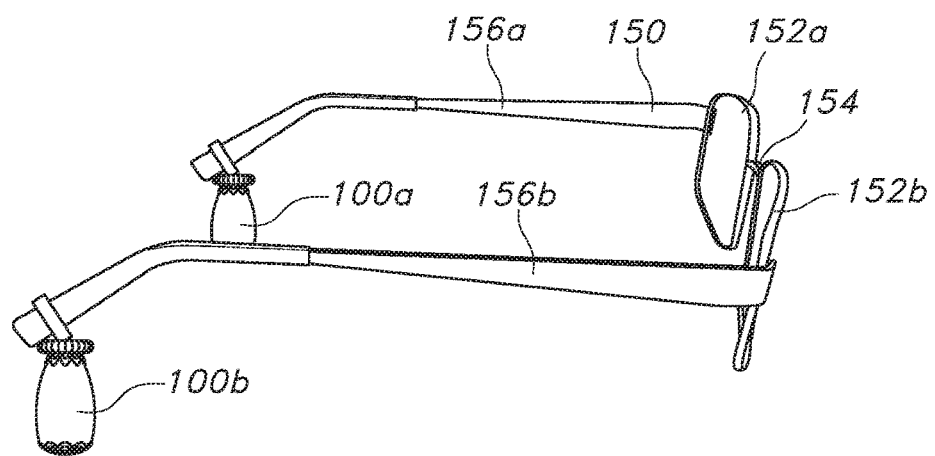
FIG. 1B illustrates a pair of counterweight devices 100 secured to the temples of a pair of eyeglasses.

FIGS. 1A and 1B illustrate an example implementation of a counterweight device for eyeglasses 100. In some implementations, a counterweight device 100 may be secured to the backend of each temple 156a, 156b and thereby remove some to all weight of the eyeglasses 150 from the nose and/or cheeks of the wearer. In this way, the eyeglasses 150 may be prevented from inducing headaches, denting the wearer's nose, and/or causing general discomfort. In some implementations, a pair of counterweight devices (e.g., 100a, 100b) may be used to counterbalance the weight of the eyeglasses 150. In this way, the eyeglasses 150 may be prevented from sliding down the nose of the wearer and stay properly aligned with the eyes. In some implementations, each counterweight device 100 may be decorative thereby enhancing the visual appeal of the eyeglasses 150 to which they are attached.

As shown in FIG. 1A, in some implementations, a counterweight device 100 may comprise an elastic loop 110 attached to a weight 120 by a connector 125 (e.g., a braided thread). In some implementations, the weight 120 may include decorative elements thereon. In some implementations, the elastic loop 110 and the weight 120 may be connected together using any suitable connector known to those of ordinary skill in the art.

As shown in FIG. 1B, in some implementations, a pair of counterweight devices 100a, 100b may be used in conjunction with a pair of eyeglasses 150. In some implementations, the eyeglasses 150 may comprise a first lens 152a and a second lens 152b (collectively lenses 152), a nose bridge 154, and a first temple 156a and a second temple 156b (collectively temples 156). In some implementations, the eyeglasses 150 may further comprise a frame that surrounds all or a portion of the lenses 152 (not shown). The eyeglasses 150 shown herein are for illustrative purposes only and are not intended to limit the scope of the invention to use therewith.

As shown in FIG. 1A, in some implementations, the elastic loop 110 of a counterweight device 100 may define an opening 112 that extends therethrough. In some implementations, the elastic loop 110 may be stretched so that the opening 112 thereof can fit about the backend of a temple 156a, 156b (see, e.g., FIG. 1B). In some implementations, the elastic loop 110 may be fabricated from rubber (e.g., latex and/or non-latex) or any other material that is sufficiently elastic and/or resilient for use as part of a counterweight device 100.

In some implementations, the elastic loop 110 may be an elastic cylindrical tube.

As shown in FIG. 1A, in some implementations, the weight 120 of the counterweight device 100 may dangle from the elastic loop 110. In some implementations, the weight 120 may be made of tungsten, a tungsten alloy, and/or another suitably dense material that is non-toxic. In some implementations, the weight 120 may weigh between ¼-¾ of an ounce, inclusive of ¼ and ¾. In some implementations, the weight 120 may weigh less than ¼ or more than ¾ of an ounce. In some implementations, the weight 120 may be bullet shaped (see, e.g., FIG. 1A). In some implementations, the weight 120 may be any suitable shape.

As shown in FIG. 1B, in some implementations, when a pair of counterweight devices 100a, 100b is used in conjunction with a pair of eyeglasses 150, the weight 120 of each counterweight device 100 may weigh the same, or approximately the same. In this way, the counterweight devices 100 may be used to counterbalance the weight of the eyeglasses 150 and thereby assist with aligning the lenses 152 with the eyes of the wearer.

In some implementations, a counterweight device 100 may not be decorative.

As shown in FIG. 1B, in some implementations, each counterweight device 100a, 100b may be secured to the temples 156 of the eyeglasses 150 using the following steps.

Initially, the backend of the first temple 156a may be inserted into and through the elastic loop 110 of the first counterweight device 100a. Then, the counterweight device 100a may be positioned on the earpiece of the first temple 156a (see, e.g., FIG. 1B).

Next, the backend of the second temple 156b may be inserted into and through the elastic loop 110 of the second counterweight device 100b. Then, the counterweight device 100b may be positioned on the earpiece of the second temple 156b (see, e.g., FIG. 1B).

In some implementations, each counterweight device 100a, 100b may be removed from a temple 156a, 156b of the eyeglasses 150 by reversing the steps set forth above.

Figure 2A:
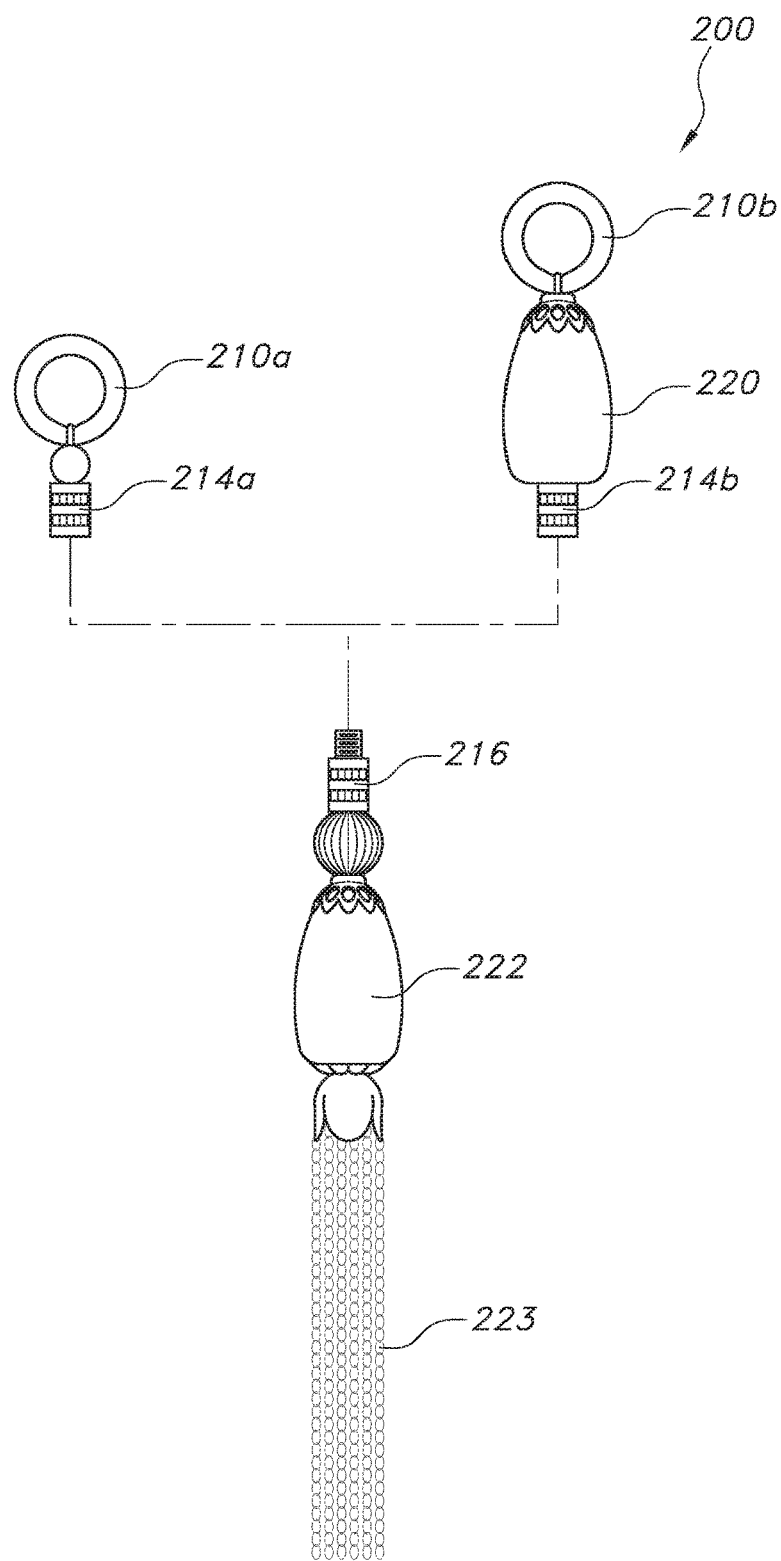
FIGS. 2A and 2B illustrate another example implementation of a counterweight device 200 for eyeglasses according to the principles of the present disclosure.
Figure 2B:
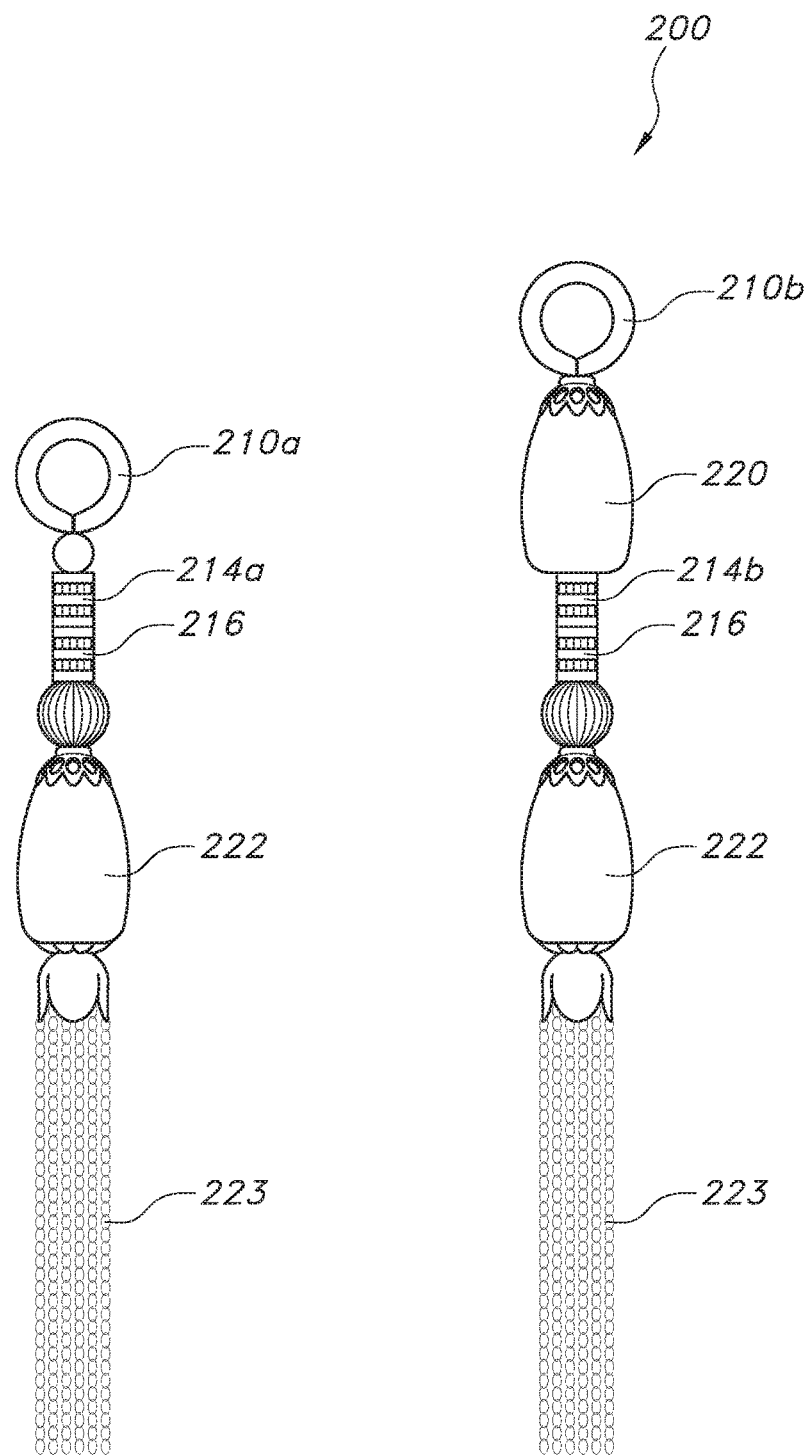

FIGS. 2A and 2B illustrate another example implementation of a counterweight device for eyeglasses 200. In some implementations, the counterweight device 200 is similar to the counterweight device 100 discussed above but includes fasteners (e.g., elements 214a, 214b, 216) configured to removably secure a weight 222 (e.g., a second weight) to an elastic loop 210a and/or to a first weight 220 dangling from another elastic loop 210b. In some implementations, through the use of threaded fasteners (e.g., a combination of elements 214a and 216, and/or 214b and 216), the overall weight and/or look of a counterweight device 200 may be changed by the wearer.

As shown in FIG. 2A, in some implementations, the first elastic loop 210a may include a fastener 214a thereon that is configured to threadedly secure to the fastener 216 extending from the second weight 222.

As shown in FIG. 2A, in some implementations, the first weight 220 dangling from the second elastic loop 210b may include a fastener 214b thereon that is configured to threadedly secure to the fastener 216 extending from the second weight 222.

In some implementations, any suitable fastener may be used to removably connect the second weight 222 to the first elastic loop 210a and/or to the first weight 220 dangling from the second elastic loop 210b.

As shown in FIG. 2B, the second weight 222 of the counterweight device 200 may dangle from the first elastic loop 210a and/or the first weight 220 when attached to either. In some implementations, the second weight 222 may be decorative, (see, e.g., the tassel 223 shown in FIG. 2B). In some implementations, the second weight 222 may be made of tungsten, a tungsten alloy, and/or another suitably dense material that is non-toxic. In some implementations, the second weight 222 may weigh between ¼-¾ of an ounce, inclusive of ¼ and ¾. In some implementations, the second weight 222 may weigh less than ¼ or more than ¾ of an ounce. In some implementations, the second weight

222 may be bullet shaped (see, e.g., FIG. 2A). In some implementations, the second weight 222 may be any suitable shape.

Figure 3A:
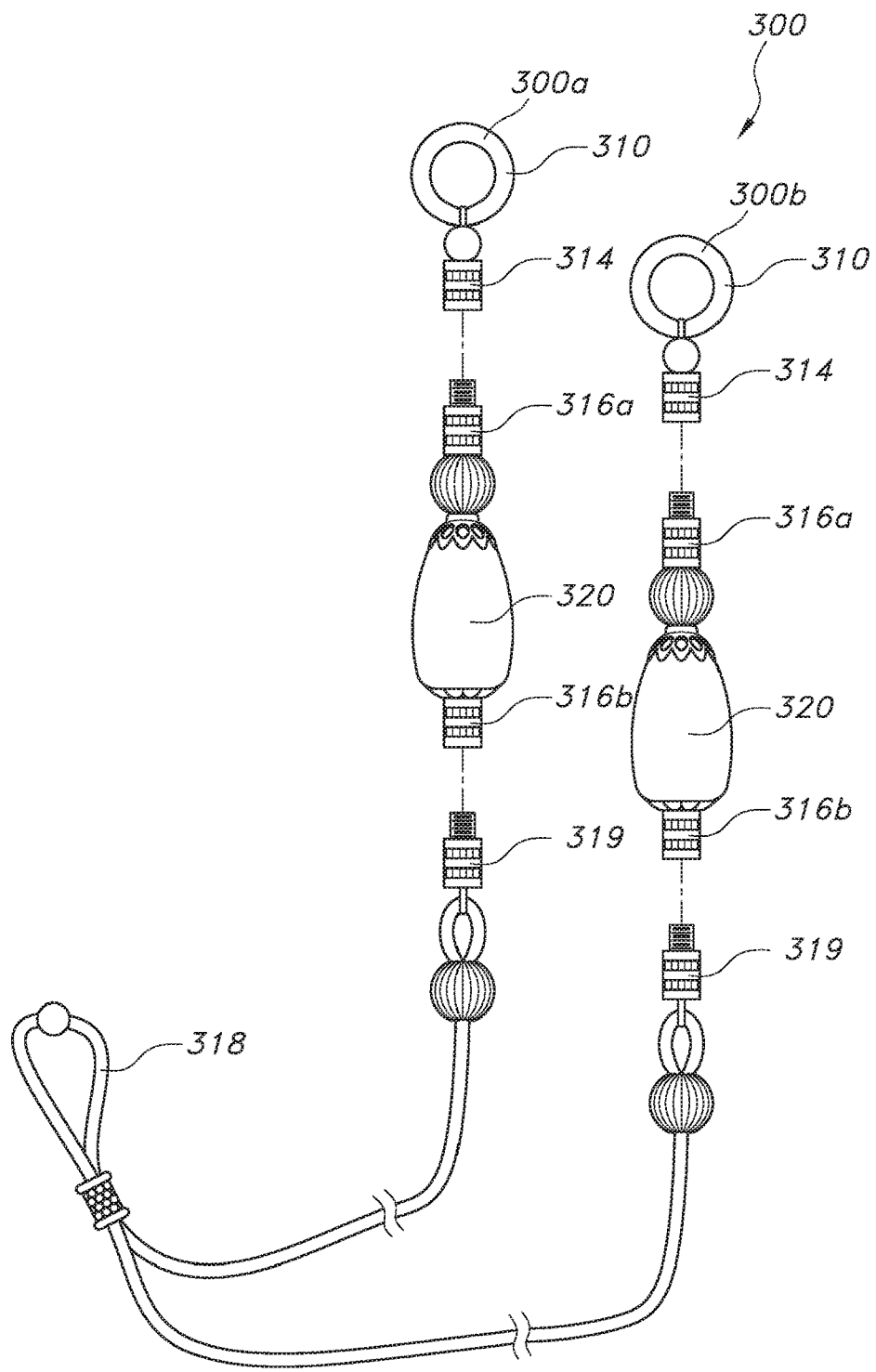
FIG. 3A illustrates yet another example implementation of a counterweight device 300 for eyeglasses according to the principles of the present disclosure.
Figure 3B:
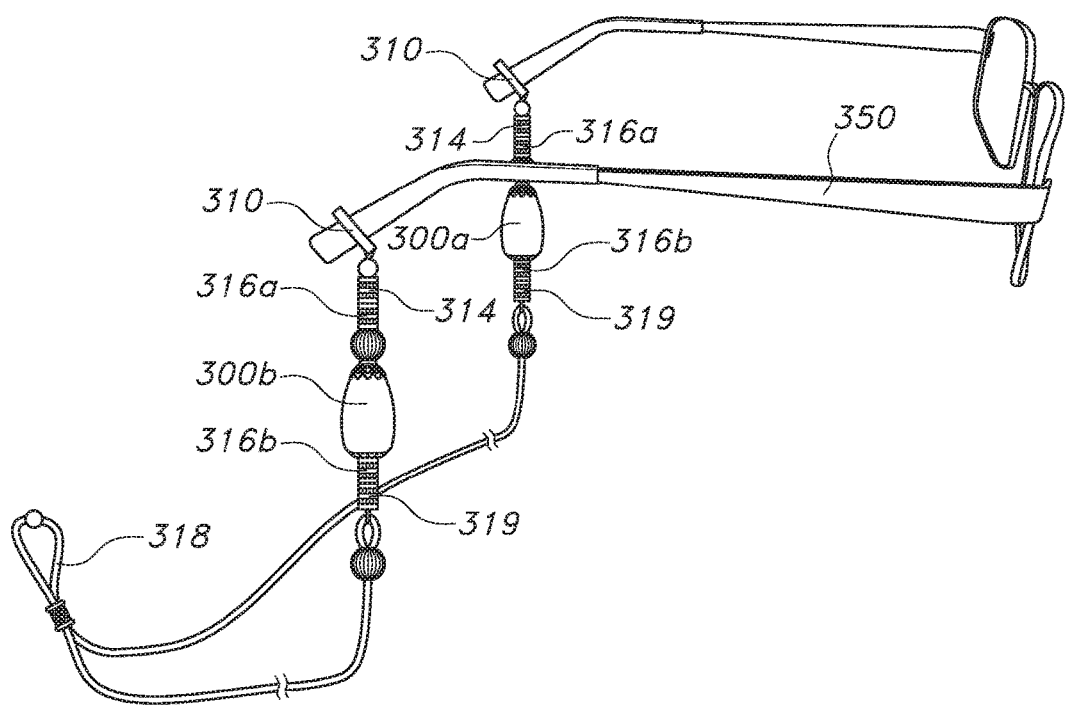
FIG. 3B illustrates a pair of counterweight devices 300 secured to the temples of a pair of eyeglasses.

FIGS. 3A and 3B illustrate yet another example implementation of a counterweight device for eyeglasses 300. In some implementations, the counterweight device 300 is similar to the counterweight devices 100, 200 discussed above but includes a lanyard 318 that is removably connected at each end thereof to a counterweight device 300a, 300b. In this way, a pair of eyeglasses 350 equipped with the pair of counterweight devices 300a, 300b may be hung from the neck of a wearer and/or prevented from falling off of the head.

As shown in FIG. 3A, in some implementations, a counterweight device 300a, 300b may comprise an elastic loop 310 having a fastener 314 thereon that is configured to threadedly secure to a first fastener 316a extending from a top side of a weight 320. In some implementations, the weight 320 of each counterweight device 300a, 300b may include a second fastener 316b extending from a bottom side thereof. In some implementations, the second fastener 316 of the weight 320 may be configured to threadedly secure to a fastener 319 positioned on the first end and/or the second end of the lanyard 318 (see, e.g., FIG. 3B).

In some implementations, any suitable fastener may be used to removably connect the lanyard 318 to the first counterweight device 300a and/or the second counterweight device 300b.

As shown in FIG. 3A, in some implementations, the lanyard 318 may be adjustable for length. In some implementations, the lanyard 318 may be fabricated from any suitable material.

Figure 4:
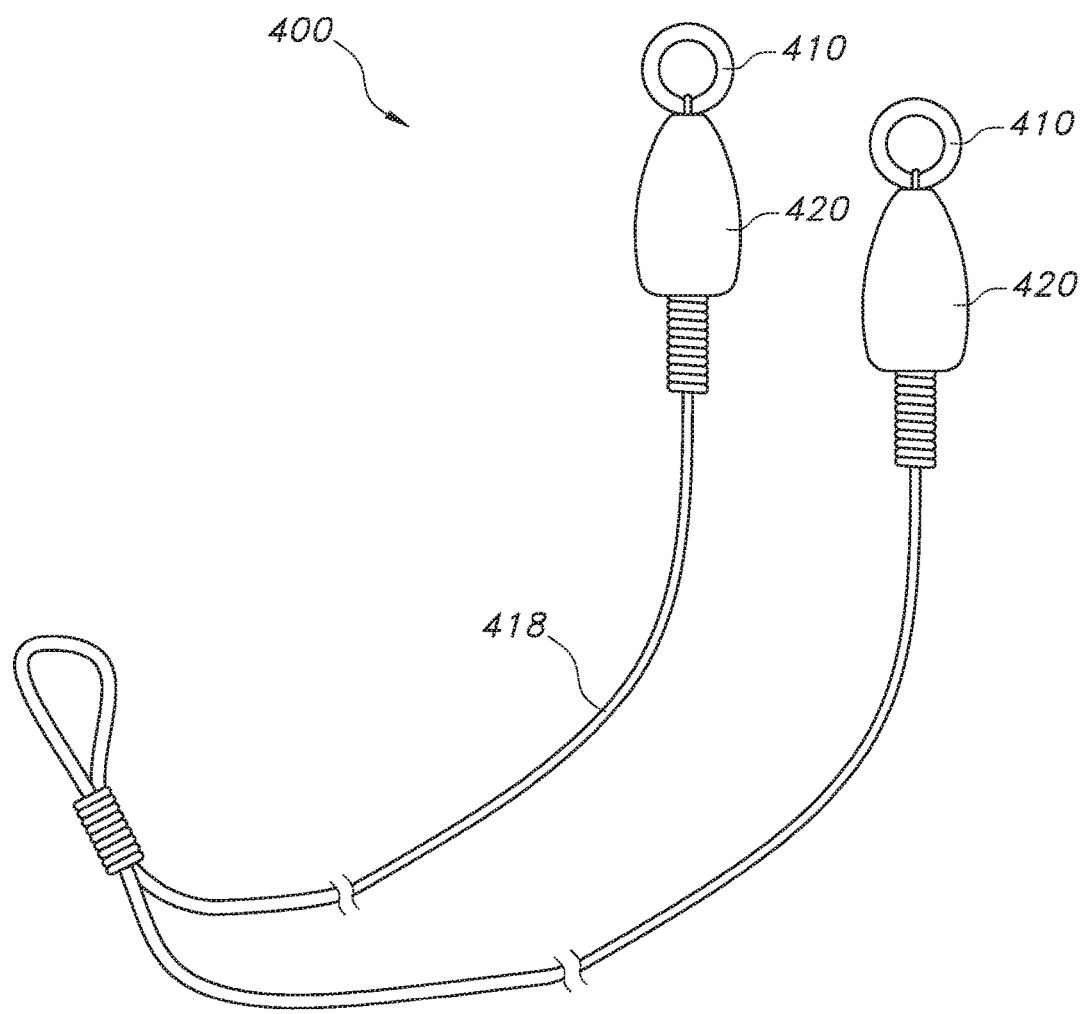
FIG. 4 illustrates still yet another example implementation of a counterweight device 400 for eyeglasses according to the principles of the present disclosure.

FIG. 4 illustrates still yet another example implementation of a counterweight device for eyeglasses 400. In some implementations, the counterweight device 400 is similar to the counterweight devices 100, 200, 300 discussed above but the lanyard 418 is fixedly secured to the weight 420 dangling from the elastic loop 410 of each counterweight device 400a, 400b. In some implementations, a weight 420 may not be decorative.

Figure 5A:
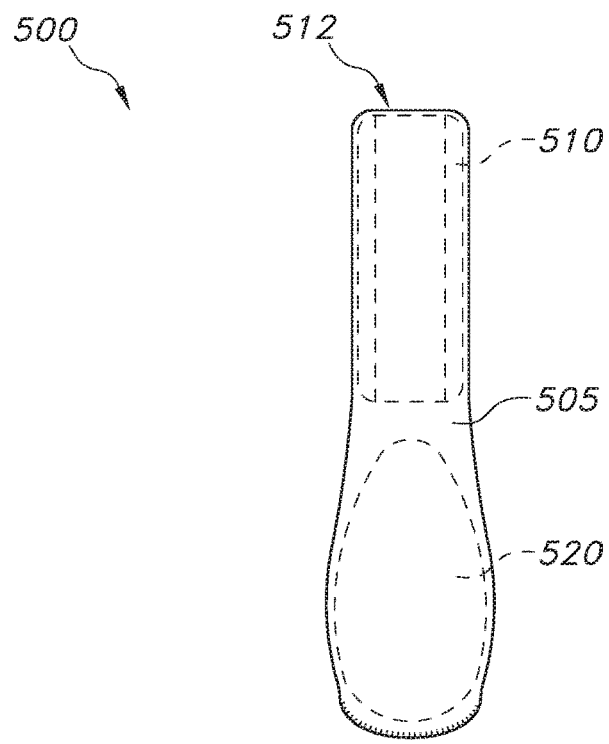
FIG. 5A illustrates yet another example implementation of a counterweight device 500 for eyeglasses according to the principles of the present disclosure, wherein broken lines are used to make the weight and elastic tube visible.
Figure 5B:
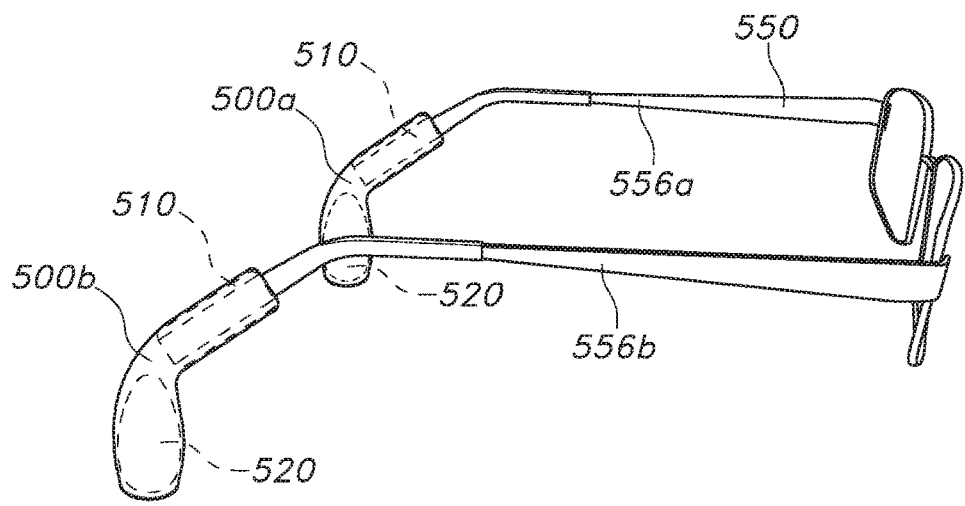
FIG. 5B illustrates a pair of counterweight devices 500 secured to the temples of a pair of eyeglasses, wherein broken lines are used to make the weight and elastic tube visible.

FIGS. 5A and 5B illustrate yet another example implementation of a counterweight device for eyeglasses 500. In some implementations, the counterweight device 500 is similar to the counterweight devices 100, 200, 300, 400 discussed above but the counterweight device 500 may comprise an elastic tube 510 and a weight 520 that are contained within a cloth housing 505. In some implementations, a counterweight device 500 may be secured to the backend of each temple 556a, 556b and thereby remove some to all weight of the eyeglasses 550 from the nose and/or cheeks of the wearer.

In some implementations, the elastic tube 510 of the counterweight device 500 may define an opening 512 that extends therethrough. In some implementations, the elastic tube 510 may be stretched so that the opening 512 thereof can fit about the backend of a temple 556a, 556b (see, e.g., FIG. 5B). In some implementations, the elastic tube 510 may be fabricated from rubber (e.g., latex and/or non-latex) and/or any other material that is sufficiently elastic and/or resilient for use as part of a counterweight device 500.

As shown in FIG. 5A, in some implementations, the weight 520 of the counterweight device 500 may be positioned adjacent to (or in-line with) the backend of the elastic tube 510 within the cloth housing 505. In some implementations, the weight 520 may be made of tungsten, a tungsten alloy, and/or another suitably dense material that is non-toxic. In some implementations, the weight 520 may weigh between ¼-¾ of an ounce, inclusive of ¼ and ¾. In some implementations, the weight 520 may weigh less than ¼ or more than ¾ of an ounce. In some implementations, the weight 520 may be bullet shaped (see, e.g., FIG. 5A). In some implementations, the weight 520 may be any suitable shape (e.g., a cylinder, etc.).

As shown in FIG. 5A, in some implementations, the cloth housing 505 may be configured to contain the weight 520 and the elastic tube 510 therein. In some implementations, the cloth housing 505 may be configured to secure about the elastic tube 510 without preventing the backend of a temple (e.g., 556a, 556b) from being inserted into the opening 512 thereof (see, e.g., FIG. 5B).

In some implementations, the housing 505 may be made of a material other than a cloth. In some implementations, the housing 505 may be made of any material suitable for use as part of a counterweight device 500.

As shown in FIG. 5B, in some implementations, each counterweight device 500a, 500b may be secured to the temples 556 of the eyeglasses 550 using the following steps.

Initially, the backend of the first temple 556a may be inserted through the opening 512 and into the elastic tube 510 of the first counterweight device 500a. Then, the counterweight device 500a may be positioned on the earpiece of the first temple 556a so that the weight 520 extends from the backend of the first temple 556a (see, e.g., FIG. 5B).

Next, the backend of the second temple 556b may be inserted through the opening 512 and into the elastic tube 510 of the second counterweight device 500b. Then, the counterweight device 500b may be positioned on the earpiece of the second temple 556b so that the weight 520 extends from the backend of the second temple 556b (see, e.g., FIG. 5B).

In some implementations, each counterweight device 500a, 500b may be removed from a temple 556a, 556b of the eyeglasses 550 by reversing the steps set forth above.

Figure 6:
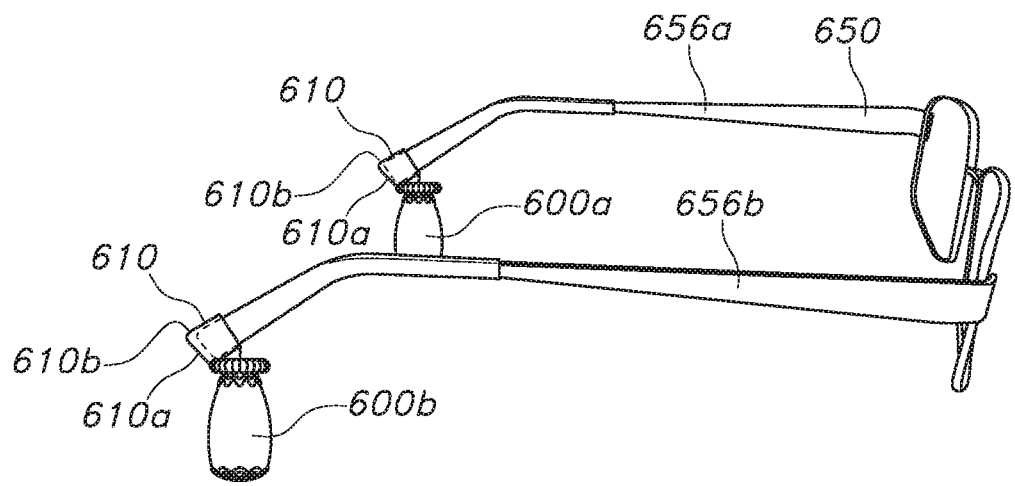
FIG. 6 illustrates still yet another example implementation of a counterweight device 600 for eyeglasses according to the principles of the present disclosure.

FIG. 6 illustrates still yet another example implementation of a counterweight device for eyeglasses 600. In some implementations, the counterweight device 600 (e.g., elements 600a, 600b) is similar to the counterweight devices 100, 200, 300, 400, 500 discussed above, in particular the counterweight device 100 shown in FIGS. 1A and 1B, but the loop (e.g., element 110) has been replaced by an elastic cap 610. In some implementations, the elastic cap 610 may be stretched so that the opening into the interior thereof can fit about the backend of a temple 656a, 656b of a pair of eyeglasses 650.

In some implementations, an elastic cap 610 may comprise an end wall 610a having a side wall 610b (e.g., a cylindrical side wall) extending therefrom. In this way, the opening into the interior of the elastic cap may be formed. In some implementations, the elastic cap 610 may be fabricated from rubber (e.g., latex and/or non-latex) and/or any other material that is sufficiently elastic and/or resilient for use as part of a counterweight device 600.

Figure 7:
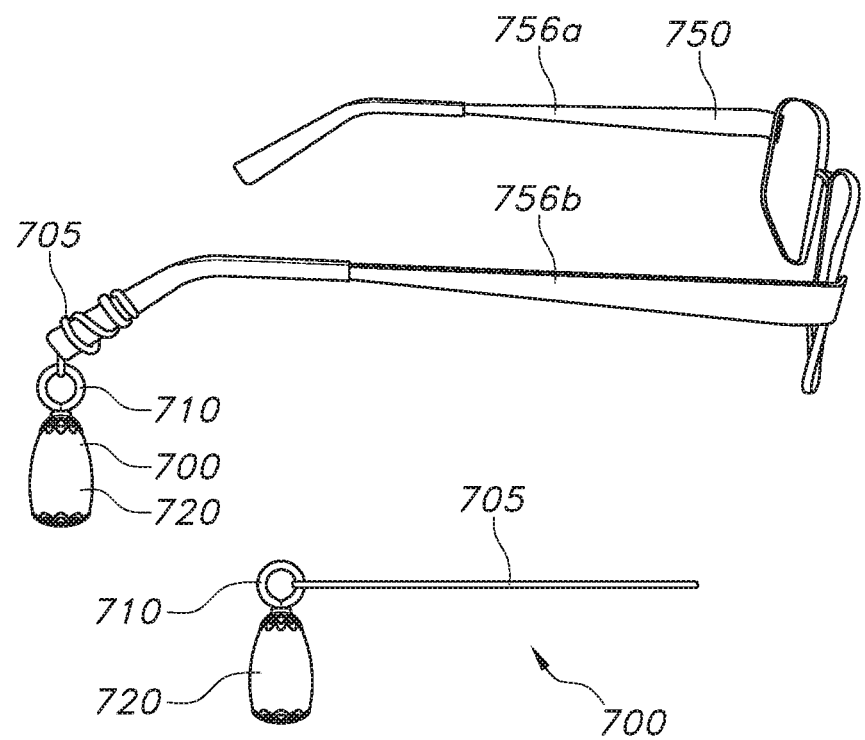
FIG. 7 illustrates yet another example implementation of a counterweight device 700 for eyeglasses according to the principles of the present disclosure, wherein a counterweight device 700 is secured to the temple of a pair of eyeglasses.

FIG. 7 illustrates yet another example implementation of a counterweight device for eyeglasses 700. In some implementations, the counterweight device 700 is similar to the counterweight devices 100, 200, 300, 400, 500, 600 discussed above, in particular the counterweight device 100 shown in FIGS. 1A and 1B, but a bendable connector 705 extends from the loop 710 thereof. In some implementations, the bendable connector 705 may be configured to coil about a temple 756a, 756b of a pair of eyeglasses 750 and thereby secure the counterweight device 700 thereon.

In some implementations, the bendable connector 705 may comprise a metal wire that is encased in plastic, or another suitably flexible covering. In some implementations, the connector 705 may be any bendable piece of material that is suitable for coiling about a temple 756a, 756b of a pair of eyeglasses 750 and thereby secure a counterweight device 700 thereon.

In some implementations, the bendable connector 705 may rely, at least in part, on friction between the material thereof and the material of the temple 756a, 756b that it is coiled about to keep the counterweight device 700 secured to a pair of eyeglasses 750. In some implementations, the bendable connector 705 may not rely on friction to keep the counterweight device 700 secured to a pair of eyeglasses 750.

As shown in FIG. 7, in some implementations, the bendable connector 705 may be slender (i.e., smaller in width proportional to length). In some implementations, the bendable connector 705 may not be slender.

In some implementations, the bendable connector 705 may be directly connected to the weight 720 of the counterweight device 700 (not shown). In this way, a counterweight device 700 may be secured to a temple 756a, 756b of a pair of eyeglasses 750 without a loop 710.

In some implementations, the loop 710 may be manufactured from metal, plastic, rubber (e.g., latex and/or non-latex), or a combination thereof, and/or any other material that is suitable for connecting the weight 720 to the bendable connector 705 of the counterweight device 700.

As shown in FIG. 7, in some implementations, a counterweight device 700 may be secured to a temple 756a, 756b of a pair of eyeglasses 750 using the following steps.

Initially, in some implementations, the weight 720 may be positioned near the distal end of a temple 756b of a pair of eyeglasses 750.

Then, in some implementations, the bendable connector 705 may be coiled about the temple 756b. In some implementations, the bendable connector 705 may be progressively coiled about the temple (e.g., element 756b) starting at, or near, the distal end thereof towards the proximal end of the temple. In some implementations, the bendable connector 705 may be coiled about the temple (e.g., element 756b) in any manner suitable for securing it thereto.

In some implementations, a counterweight device 700 may be removed from a temple 756a, 756b of the eyeglasses 750 by reversing the steps set forth above.

In some implementations, a counterweight device 100, 200, 300, 400, 500, 600, 700 may be secured to the backend of a temple of any, or nearly any, pair of eyeglasses that currently exists and/or is developed in the future.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A counterweight device for eyeglasses comprising:
an elastic loop that includes a threaded fastener, the elastic loop defines an opening that extends therethrough; and
a weight that includes a threaded fastener;
wherein the elastic loop can be stretched so that the opening thereof can fit about the backend of a temple of a pair of eyeglasses; and
wherein the threaded fastener of the elastic loop is configured to threadedly secure to the threaded fastener of the weight, thereby removably connecting the threaded fastener of the weight directly to the threaded fastener of the elastic loop.

2. The counterweight device of claim 1, wherein the elastic loop is fabricated from rubber.

3. The counterweight device of claim 1, wherein the weight is made of a material selected from the group consisting of tungsten and a tungsten alloy.

4. The counterweight device of claim 1, further comprising a second weight that includes a threaded fastener; wherein the weight includes a second threaded fastener that is configured to threadedly secure to the threaded fastener of the second weight, thereby removably connecting the threaded fastener of the second weight directly to the second threaded fastener of the weight.

5. The counterweight device of claim 4, wherein the elastic loop is fabricated from rubber.

6. The counterweight device of claim 4, wherein the weight and the second weight are made of a material selected from the group consisting of tungsten and a tungsten alloy.

7. The counterweight device of claim 1, further comprising a lanyard, one end of the lanyard is attached to the weight.

8. The counterweight device of claim 1, further comprising a lanyard, the lanyard includes a threaded fastener on a first end and a second end thereof; wherein the weight includes a second threaded fastener thereon, the threaded fastener on either the first end or the second end of the lanyard is threadedly secured to the second threaded fastener of the weight, thereby removably connecting one end of the lanyard to the weight.

9. A counterweight device for eyeglasses comprising:
a weight;
an elastic housing that contains the weight within a cavity thereof;
wherein an opening into the elastic housing may be stretched so that it can be fitted about a backend of a temple of a pair of eyeglasses; and
wherein the weight is removably positioned within the cavity of the elastic housing.

10. The counterweight device of claim 9, wherein the housing is made of cloth.

11. The counterweight device of claim 9, wherein the weight is made of a material selected from the group consisting of tungsten and a tungsten alloy.

12. A counterweight device for eyeglasses comprising:
a weight including an attachment element, the attachment element is configured to be removably secured to the backend of a temple of a pair of eyeglasses;
wherein the attachment element is an elastic cap, the elastic cap comprises an opening that extends into an interior thereof;
wherein the elastic cap and the weight each include a threaded fastener thereon, the threaded fastener of the elastic cap is configured to threadedly secure to the threaded fastener of the weight, thereby removably connecting the weight to the elastic cap.

13. The counterweight device of claim 12, further comprising a second weight that includes a threaded fastener; wherein the weight includes a second threaded fastener that is configured to threadedly secure to the threaded fastener of the second weight, thereby removably connecting the second weight to the weight.

14. The counterweight device of claim 12, further comprising a lanyard, the lanyard includes a threaded fastener on a first end and a second end thereof; wherein the weight includes a second threaded fastener thereon, the threaded fastener on either the first end or the second end of the lanyard is threadedly secured to the second threaded fastener of the weight, thereby removably connecting one end of the lanyard to the weight.

\* \* \* \* \*